United States Patent [19]

Toriu et al.

[11] Patent Number: 4,908,872

[45] Date of Patent: Mar. 13, 1990

[54] METHOD AND APPARATUS FOR EXTRACTING PATTERN CONTOURS IN IMAGE PROCESSING

[75] Inventors: Takashi Toriu; Hiromichi Iwase, both of Kawasaki, Japan

[73] Assignee: Fujitsu Limited, Kawasaki, Japan

[21] Appl. No.: 153,426

[22] Filed: Feb. 5, 1988

[30] Foreign Application Priority Data

Feb. 6, 1987 [JP] Japan .................................. 62-25711
Jun. 18, 1987 [JP] Japan ................................ 62-152001

[51] Int. Cl.$^4$ ................................................. G06K 9/48
[52] U.S. Cl. ....................................... 382/22; 382/21; 382/19; 382/18
[58] Field of Search ....................... 382/22, 21, 16, 25, 382/14, 18, 23, 19

[56] References Cited

U.S. PATENT DOCUMENTS

| 4,747,150 | 5/1988 | Knutsson et al. | 382/21 |
| 4,747,151 | 5/1988 | Knutsson et al. | 382/21 |
| 4,747,152 | 5/1988 | Knutsson et al. | 382/21 |

Primary Examiner—Leo H. Boudreau
Assistant Examiner—Michael Razaui
Attorney, Agent, or Firm—Staas & Halsey

[57] ABSTRACT

This invention relates to a method and apparatus for extracting contour lines from a pattern obtained in image processing. The disclosed method and apparatus makes it possible to obtain the contour lines in real-time and, moreover, can be easily incorporated into hardware. To achieve these objects, a invention applies the simplified discrimination method for selecting pixels, which form the pattern contour, wherein each pixel is examined within groups of pixel, i.e. X-axis and Y-axis groups. The magnitude of a gray level gradient of each pixel is compared with those of neighboring pixels located in either direction of X-axis group or Y-axis. The pixel which has the maximum magnitude of gray level gradient among those of adjacent pixels is discriminated from each group as contour date. This discrimination method is simple and remarkably improved. When contour lines for two groups are combined, the pattern contours can be easily obtained.

8 Claims, 18 Drawing Sheets

|    | X1  | X2  | X3  | X4  | X5  | X6 |
|----|-----|-----|-----|-----|-----|----|
| Y1 | 152 | 148 | 140 | 140 | 138 |    |
| Y2 | 140 | 150 | 142 | 142 | 120 |    |
| Y3 | 125 | 146 | 155 | 142 | 136 |    |
| Y4 | 132 | 140 | 145 | 148 | 142 |    |
| Y5 | 132 | 130 | 135 | 142 | 152 |    |

FIG. 11(h)
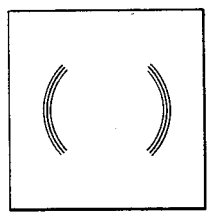
FIG. 11(i)
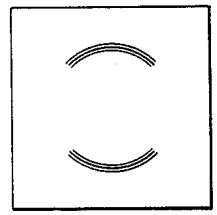
FIG. 11(j)
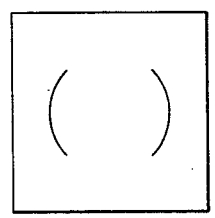
FIG. 11(k)
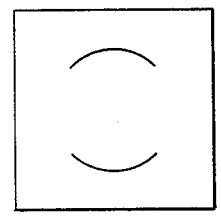
FIG. 11(ℓ)
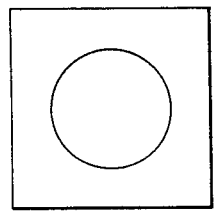

FIG. 17
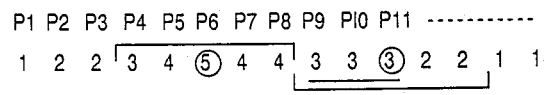
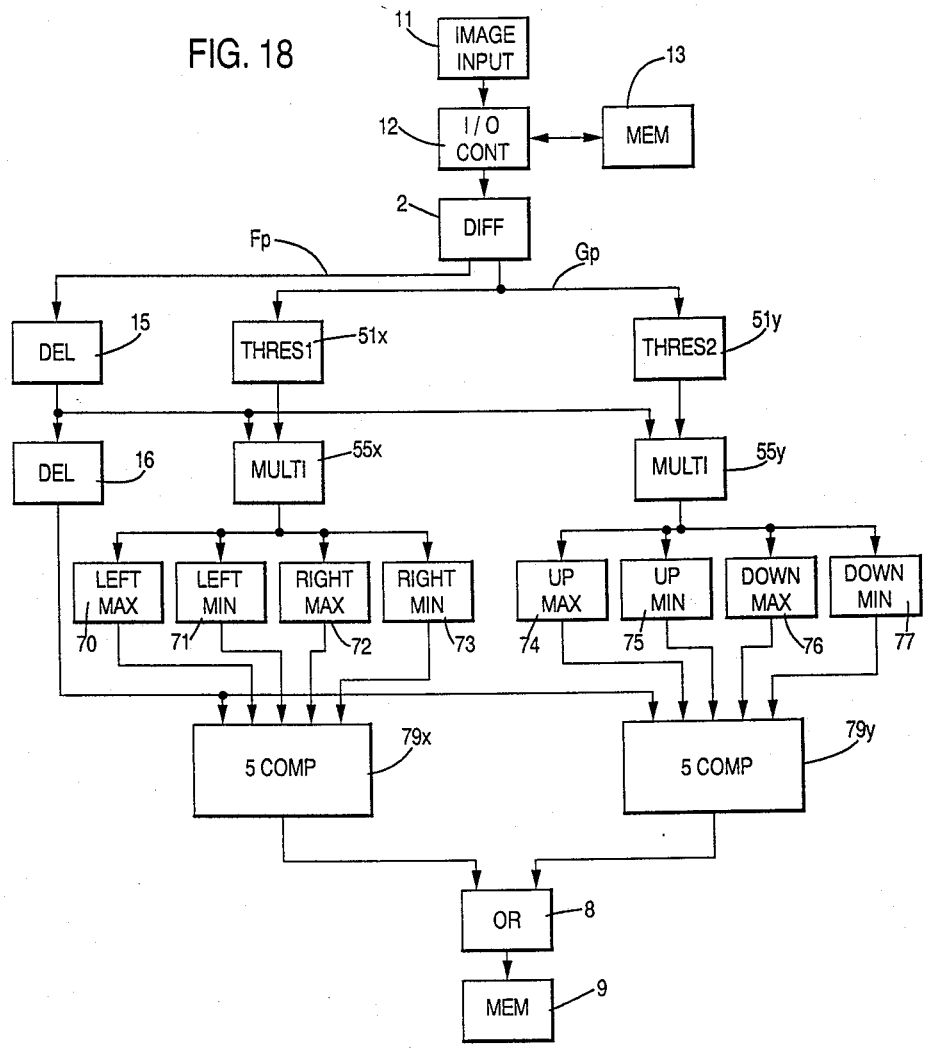
FIG. 18

METHOD AND APPARATUS FOR EXTRACTING PATTERN CONTOURS IN IMAGE PROCESSING

BACKGROUND OF THE INVENTION

1. Field of the Invention

This invention relates to a method and apparatus for extracting contour lines from a pattern obtained in image processing technology. More particularly, this invention relates to a method and apparatus for obtaining the contour lines in real-time and provides a method wherein procedures can be partly incorporated into hardware.

2. Description of the Prior Art

With progress in image processing technology, its application fields are widely expanded into the fields of handling or inspecting an object image, or recognizing a character contour lines of an object image are extracted and distinguished from a pattern formed by an inputted signal obtained from a TV camera or the like source.

In image processing, the picture image is decomposed into small picture elements (picture element is abbreviated as a pixel) forming a matrix. The information related to each pixel is stored in a memory unit in the form of a "word". Each word has a specified word length including address information in rectanglar coordinates, multi gray level information (brightness or density level of each pixel having a multi-level magnitude) of 3 to 8 bits, and primary color information of red, green and blue. However, the present invention is related to the processing techniques solely on extracting the contours of an image, therefore, only a black and white image is dealt with. In the present invention, multi gray levels such as having more than 10 levels are dealt with in image processing. Because it is very easy to extract pattern contours from an image, formed with a binary level (only black or white level), the processing of the binary level image is excluded from the present invention.

As a method of extracting pattern contour, several methods are utilized in the prior art.

(1). The pattern is first processed into a binary code, and then the edge boundary thereof is extracted. This method has a merit of high speed, however, it is difficult to select the appropriate threshold value for binary coding of the pattern.

(2) The pattern is checked whether a pixel has a large change in density or gray level among neighboring pixels or not, and when the pixel is found to have a large change, the pixel is discriminated as being on the contour line. This method has a demerit of forming many broken off contours.

(3) The pattern is subjected to Gauss Laplacian processing (a kind of finding a second derivative of the gray level of each pixel), and when the pixel is found to have a sign change with regard to neighboring pixels, the pixel is regarded as being on the contour line. The accuracy is very good, however, this method requires a large scale computer system.

(4) The pattern is checked whether a pixel has a maximum level in the direction of its gray level gradient. The accuracy is very good, however, this method requires a lot of time in processing.

Among the above methods of the prior art, method (4) is very advantageous in accuracy and hardware-scale when the processing speed is improved. The reason for requiring a lot of time exists in that this method of extracting pattern contours mainly depends on the software technology, i.e. complexities of its algorithm. The details of the algorithm of this method are explained further.

FIG. 1 illustrates partly a gray level distribution stored in a memory for a matrix of pixels arranged in two-dimensional coordinates X and Y. For the sake of convenience, the coordinates of each pixel are expressed by X1 to X6 and Y1 to Y5, and the numeral entered in the square represents the gray level of each pixel. In order to extract pattern contours from the image of FIG. 1, process flows, for example, are shown by a block diagram of FIG. 2. Image data, which are stored in a memory unit in image input section 1 consisting of a plurality of address and gray level information, are subjected to X-direction differential calculator 31x and Y-direction differential calculator 31y, where gray level differentials Dx and Dy and X and Y directions are calculated. These component data Dx, Dy are combined and inputted to two component calculators of a vector, because the gray level gradient forms a vector (a word "gradient" is used instead of differential because a vector is dealt with). Two component calculators consist of gradient magnitude calculator 32 and gradient direction calculator 33, where components Fp and Gp of the gray level gradient vector can be obtained. The data are inputted to contour extractor 34, where calculations are carried out for each pixel by comparing its gray level data with those of adjacent pixels. The comparison of gray level gradients is carried out in a direction of the gray level gradient vector, and when the pixel is found to have a maximum gray level gradient, this pixel is regarded as one forming pattern contour and is distinguished from others.

Details of the above steps are explained further using FIG. 3. To explain calculation of Dx and Dy in X-direction differential calculator 31x and Y-direction differential calculator 3y of FIG. 2, an array of 3×3 pixels, 8 pixels being denoted as 00–22 and surrounding pixel P in X, Y coordinates, is taken into consideration. When the gray level of each pixel is denoted as $L_{00}$–$L_{22}$, then the the gray level differentials Dx and Dy in X and Y directions of pixel P are assumed to have the values calculated by the following equations:

$$Dx = (L_{22} + L_{12} + L_{02} - L_{20} - L_{10} - L_{00})/3,$$

$$Dy = (L_{22} + L_{21} + L_{20} - L_{02} - L_{01} - L_{00})/3.$$

The values of Dx and Dy obtained by the above equations show the average X and Y direction differentials respectively, both differentials being sought between two groups of pixels located on both sides of pixel P. These values Dx and Dy are used as the components forming the gray level gradient of pixel P.

The gray level gradient is a quantity having magnitude and direction, forming a vector. Therefore, it is necessary to find out the absolute magnitude and direction of the gray level gradient vector, denoted as Fp and Gp.

Magnitude Fp can be obtained in gray level gradient calculator 32 using the following relation:

$$Fp = (Dx^2 + Dy^2)^{\frac{1}{2}}.$$

And further, direction Gp of the gray level gradient can be calculated in gradient direction calculator 33 using the following equations:

$$Gp = \cos^{-1}(Dx/Fp)$$

where $Dy \geq 0$, $$Gp = -\cos^{-1}(Dx/Fp)$$

where $Dy < 0$.

To extract contour lines, it is necessary to perform the above calculation for each pixel, which has Fp magnitude greater than a specified value. On the contrary, for the pixel which has a smaller Fp magnitude than specified, particularly selected numeals such as 999, or the like are outputted, and such pixels are regarded as irrelevant pixels for the pattern contour. In this way, Fp and Gp values for each pixel are calculated in gray level gradient calculator 32 and gradient direction calculator 33 one by one sequentially.

Thereafter utilizing the following algorithm, the pixels which form the pattern contour are selected and other pixels unsuitable for forming pattern contour are excluded in contour extractor 34.

In contour extractor 34, Gp data are first grouped into eight groups by direction as shown in FIG. 4. The circumference is equally divided in to 8 arcs, references a, b, c, and d are given to each arc, and two arcs located on opposite sides of the origin are given the same references. The area banded by two radii and the arc such as a, b, c, or d is subject to investigation, and such an area is referred to as sector a, b, c, or d respectively. The positive direction of the X-axis is taken as the reference, each sector is defined by the following conditions:

sector a; $\pi/8 > Gp \geq -\pi/8$, and the region further rotated by an angle $\pi$, sector b; $3\pi/8 > Gp \geq \pi/8$, and the region further rotated by an angle $\pi$, sector c; $5\pi/8 > Gp \geq 3\pi/8$, and the region further rotated by an angle $\pi$, and sector c; $7\pi/8 > Gp \geq 5\pi/8$, and the region further rotated by an angle $\pi$.

Depending on which sector the gray level gradient vector Gp is contained in, one of the following discriminating conditions is applied. The pixel satisfying the following conditions is regarded as one of pixels forming pattern contour.

(1) When Gp is contained in sectors a, the following two conditions are satisfied:

$Fp(x,y) \geq Fp(x-1,y)$, and $Fp(x,y) \geq Fp(x+1,y)$.

(2) When Gp is contained in sectors b, the following two conditions are satisfied:

$Fp(x,y) \geq Fp(x+1,y+1)$, and $Fp(x,y) \geq Fp(x-1,y-1)$.

(3) When Gp is contained in sectors c, the following two conditions are satisfied:

$Fp(x,y) \geq Fp(x,y+1)$, and $Fp(x,y) \geq Fp(x,y-1)$.

(4) When Gp is contained in sectors d, the following two conditions are satisfied:

$Fp(x,y) \geq Fp(x+1,y-1)$, and $Fp(x,y) \geq Fp(x-1,y+1)$.

Each group of the above conditions determines whether or not the gray level magnitude Fp for pixel P in process of FIG. 3 has a maximum value among the three pixels along its gradient direction Gp. If Fp is found to be maximum, the pixel P is judged to be on the pattern contour.

For example, the pixel located at the coordinate (X3,Y3) of FIG. 1 shows that Gp thereof has the direction shown by the arrow and the gray level magnitudes of two adjacent pixels (X2,Y4) and (X4,Y2) along the arrow are less than that of pixel P(X3,Y3). Therefore pixel P is judged to be one of pixels forming the pattern contour.

In the above explanation, the comparison to find out the maximum value is performed with two adjoining pixels. However, in the practical application, the comparison is performed usually among five to seven neighboring pixels for more accuracy. This is schematically illustrated in FIGS. 5 and 6. Each arrow is assumed to show the magnitude and direction of the gray level gradient vector corresponding to each pixel. In FIG. 5, when vector p is compared with four vectors a to d, it is found that vector b is maximum and vector p is less than vector p. Therefore, vector p is indicates that this pixel is not on the pattern contour. In the same way, when vector p' is compared with four vectors a' to d', vector p' is found to be maximum and therefore indicates that the pixel is on the pattern contour.

In this way, all pixels are subjected to discrimination procedures and finally, marked pixels of FIG. 6 forming the pattern contour are extracted.

In order to extract the pattern contours, the procedures are repeated for all pixels following the above algorithm. The discriminated pixels form the pattern contours. The procedures are written in a program form and executed under the program control. However, the above noted procedure require a lot of process time and are not suitable for extracting pattern contours in real-time process. Therefore, it is required that some parts of the procedures are incorporated into a hardware as much as possible in order to obtain a higher speed of processing.

SUMMARY OF THE INVENTION

It is a general object of the invention, therefore to provide the method of extracting contour lines with a high speed, and further to provide the apparatus, wherein real-time processing is possible.

It is another object of the invention to provide the method and apparatus for extracting contour lines with increased accuracy as much as possible.

It is still another object of the invention to provide the apparatus for extracting contour lines, wherein the procedure steps are incorporated into hardware as much as possible.

In order to achieve these objects, the present invention applies the simplified discrimination method of selecting the pixel having the maximum magnitude of gray level gradient vector, wherein gray level gradient vectors are grouped into X-axis groups and Y-axis groups and the comparison of magnitudes is performed among pixels located along the X-axis direction or Y-axis direction. FIG. 7 shows schematically the direction in which the comparison of gray level gradient magnitudes is performed for the selected few pixels. Vectors of pixels a and b belong to X-axis groups and vectors of pixels c and d, to Y-axis groups.

In order to discriminate the specific pixel as one of pixels forming the pattern contour or not, the gray level data of the pixel subjected to discrimination and together with that of neighboring pixels are first inputted to X and Y differential calculators. This data is next provided to a gradient magnitude calculator and gradient direction calculator in a similar way as in the prior art. Because the gray level gradient is a vector quantity, it is necessary to calculate the magnitude Fp and direction Gp of gray level gradients for the subsequent processes.

Next, the gray level gradient vector for each pixel is divided into two groups, i.e. an X-axis group and Y-axis group. When the specific pixel has angle Gp in the ranges of ±45° and 180°±45° with reference to the X-axis, this pixel is processed subsequently as the X-axis group. When the specific pixel has angle Gp in the ranges of 90°±45° and 270°±45° with reference to the X-axis, this pixel is processed subsequently as the Y-axis group.

In order to extract the pixels forming the pattern contour, the pixel having the maximum magnitude Fp among adjacent pixels should be selected. This extraction procedure can be carried out by comparing Fp data of the pixel subjected to discrimination with those of pixels located in either the X-direction or Y-direction only. This is quite different from the prior art, wherein the comparison is performed along the direction of gray level gradient.

Further to make it easier to discriminate the pixel having maximum magnitude Fp in the first embodiment, a maximum value filter and a comparator are used for the X-axis group and Y-axis group respectively. The maximum value filter performs the function of replacing the magnitude Fp of the subjected pixel or, center pixel (hereinafter, the pixel subjected to discrimination is briefly called as the center pixel), by the maximum magnitude Fpmx for an X-axis group, where Fpmx corresponds to a maximum value for plural pixels located in the left and right sides of the center pixel. For a Y-axis group, the substituted of Fpmy is carried out with regard to the Y-direction.

In this way, gray level gradient magnitude data for each pixel is transormed to the maximum value of Fpm among neighboring pixels in X or Y-directions for X-axis or Y-axis groups respectively. Then, the transformed data of the center pixel is compared with its original Fp value in comparators, and when Fpmx or Fpmy is equal to Fp, logical "1" is given to this pixel, otherwise logical "0" is given. This comparison process eliminates a complex procedure of the prior art in extracting and forming the pattern contour.

Finally, both outputted logical signals from two comparators are inputted to a logical sum circuit (OR circuit), where two components of the pattern contour are combined and outputted to a pattern contour memory.

In the prior art, angle Gp of the specific pixel is first subjected to a discriminating step of determining which sector it belongs to among 4 sector groups a to d shown in FIG. 4. When the sector is determined, then magnitude Fp is compared with those of neighboring pixels located long the same direction of Gp. When Fp is found to have the maximum value, this pixel is discriminiated to be one of pixels forming pattern contour.

According to the present invention, the pixels are grouped into an X-axis group as determined or Y-axis group by the direction of its gray level gradient vector. Namely, one group is processed in the X-direction and another processed in Y-direction. For example, as for the pixel having its gray level gradient direction in the range angles of ±45° with respect to the X-axis, the replacement to Fpmx and comparison procedure are carried out only in the X-direction. The process of discriminating the pixel which has the maximum value can be made simple and easy. A thus selected pixel constitutes the pattern contour. This procedure is the same for the pixels belonging to the Y-axis group. The outputs of two groups are combined, giving the required pattern contour.

Other aspects of eliminating inaccurate contours generated sometimes in practicing the above procedure, other modifications, and the several advantages of the present invention will become apparent to one skilled in the art from a reading of the following disclosure and appended claims.

BRIEF DESCRIPTION OF THE DRAWINGS

FIGS. 11(a) to 11(l) illustrate schematically the output patterns at various points in FIG. 8, wherein FIG. 11(a) shows an input image pattern; FIG. 11(b), magnitude of gray level gradient; FIG. 11(c), direction of gray level gradient vectors; FIGS. 11(d) and 11(e), outputs from threshold processors 51x and 51y; FIGS. 11(f) and 11(g), outputs from product circuits 55x and 55y; FIGS. 11(h) and 11(i), outputs from maximum value filters 6x and 6y; FIGS. 11(j) and 11(k) outputs from comparators 7x and 7y; and FIG. 11(l), outputted pattern contour, FIG. 17 illustrates a problem encountered in the first and second embodiments, FIG. 18 shows a block diagram of the third embodiment of the present invention, and FIG. 19 through FIG. 25 show detailed circuits of FIG. 18, wherein FIG. 19 shows a right maximum discriminator circuit 72; FIG. 20, a right minimum discriminator circuit 73; FIG. 21, a left maximum discriminator circuit 70; FIG. 22, a left minimum discriminator circuit 71; FIG. 23, an up maximum discriminator circuit 74; FIG. 24, a down maximum discriminator circuit 76; and FIG. 25, a five-input comparator circuit.

DETAILED DESCRIPTION OF THE PREFERRED EMBODIMENTS

1. First embodiment

Figures 1, 2:
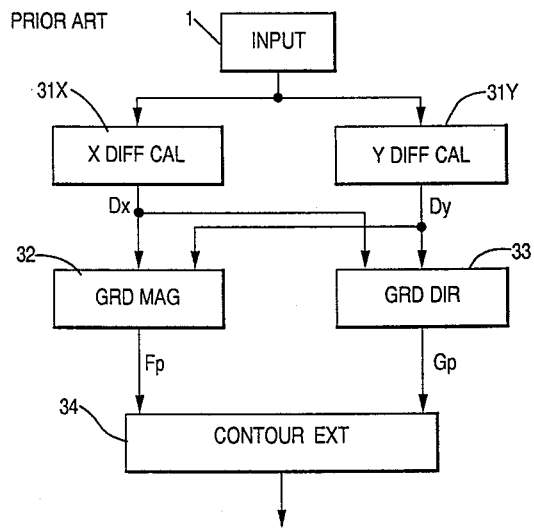
FIG. 1 shows a distribution of gray level data for pixels arranged in a matrix in the two-dimensional coordinates.
FIG. 2 shows a block diagram for extracting pattern contours in the prior art.
Figure 3:
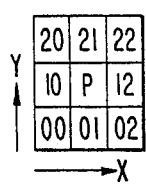
FIG. 3 shows a 3×3 matrix of pixels to explain the calculation of differentials.
Figure 4:
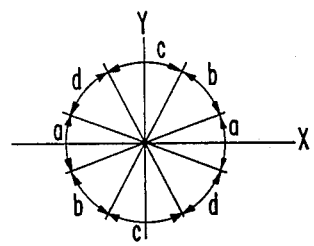
FIG. 4 shows the directions of gray level gradient vectors grouped into eight sectors in the coordinates.
Figure 5:
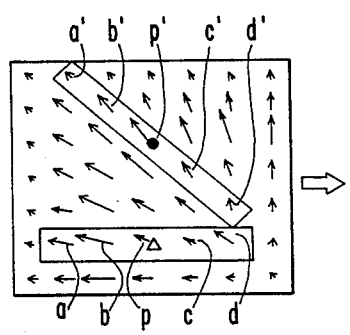
FIG. 5 illustrates that the magnitude of gray level gradient vector p or p' is compared along the direction of a strip-shaped box in the prior art.
Figure 6:
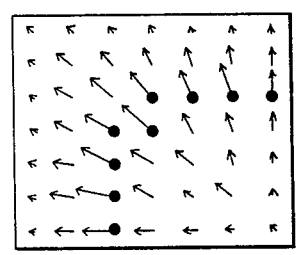
FIG. 6 shows an example of a contour formed by the painted marks extracted from FIG. 5.
Figure 7:
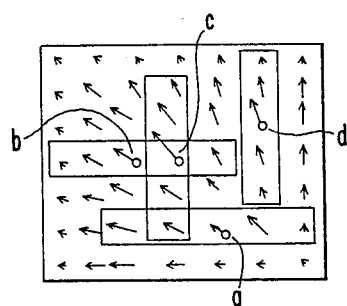
FIG. 7 illustrates the method of the present invention, wherein directions of gray level gradient vectors are grouped into X-axis groups and Y-axis groups.
Figure 8:
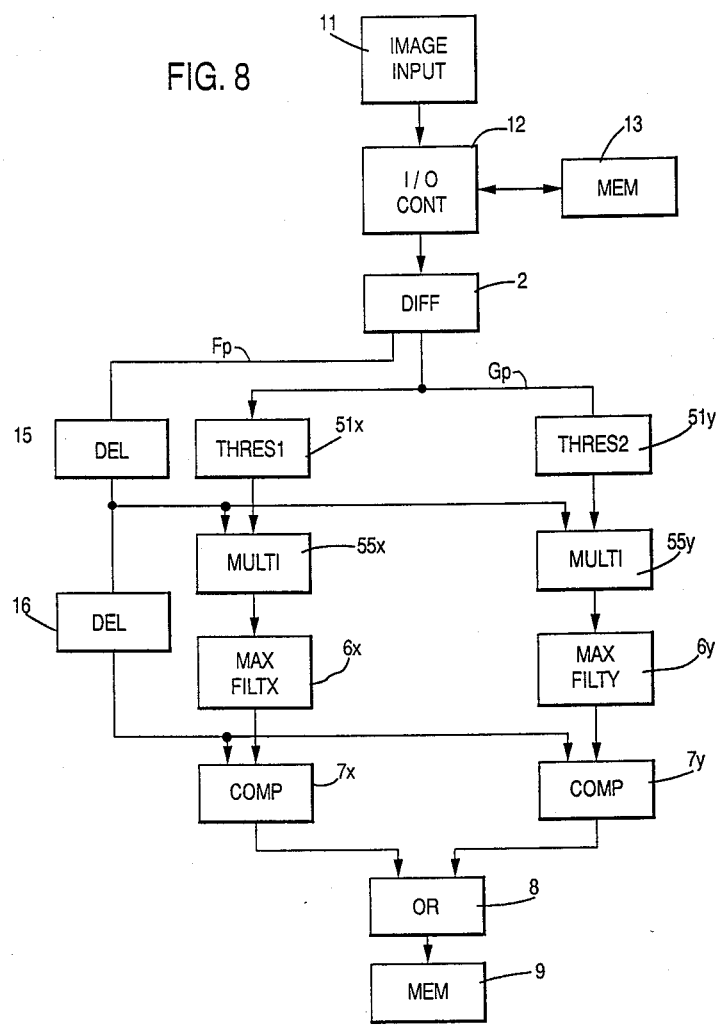
FIG. 8 shows a block diagram of the first embodiment of the present invention.

As a basic system, a block diagram of a first embodiment according to the present invention is shown in FIG. 8. The pattern data obtained by image input device 11, such as a TV camera, are provided to input-and-output (I/O) controller 12 and stored in memory unit 13. The pattern data are then inputted to differential and vector component calculator 2. This calculator 2 includes differential calculators in X and Y directions, a vector magnitude calculator and vector direction calculator (details are explained later).

X-direction differential Dx and Y-direction differential Dy are first calculated in the X-direction differential calculator and Y-direction differential calculator of calculator 2 respectively. And next in calculator 2, both Dx and Dy data are inputted to a gradient magnitude calculator, where Fp value of $(Dx^2+Dy^2)^{\frac{1}{2}}$ is calculated, and also inputted to a gradient direction calculator, where the direction angle of the gray level gradient vector is calculated. The above procedures are similar steps as explained in the prior art.

Next, the direction Gp of the gray level gradient vector is inputted to both threshold processors 51x and 51y. When angle Gp comprises direction data in the ranges of ±45° and 180°±45° with reference to the X-axis, in other words for a pixel of an X-axis group, threshold processor 51x outputs logical "1" and threshold processor 51y outputs logical "0". When angle Gp is found to be in the ranges of 90°±45° and 270°±45° with reference to the X-axis, threshold processor 51y outputs logical "1" and threshold processor 51x outputs logical "0".

And further, the above logical data and vector magnitude Fp are inputted to two product circuits 55x and 55y and multiplied therein. Here, Fp data is inputted through delay circuit 15, because the inputs to product circuits 55x, 55y are to be synchronous with outputs from threshold processors 51x, 51y. Therefore, a product circuit 55x, 55y outputs Fp only when it receives logical "1" signal from a threshold processor 51x, 51y. The outputted data are then subjected to maximum value filters 6x and 6y.

Maximum value filter 6x has a function of replaced magnitude Fp at the center pixel of address ADDxy in process by the maximum magnitude Fpmx, which is the maximum value among pixels located serially in left and right sides of the center pixel at ADDxy, such as ADD(x−n)y to ADD(x+n)y. The Fp value of pixel ADDxy is thus replaced by Fpmx and is outputted to comparator 7x. Maximum value filter 6y has a similar function with regard to the Y-axis group, and magnitude Fp is replaced by maximum value Fpmy, which is outputted to comparator 7y.

The outputted maximum value Fpmx or Fpmy for the center pixel is compared in comparators 7x or 7y with its original Fp value pixel by pixel sequentially. In this process, Fpmx or Fpmy is synchronized with Fp due to delay circuit 16, and when Fpmx or Fpmy is equal to Fp, then logical "1" is given to the center pixel, otherwise logical "0" is given.

The above processes eliminate a complex procedure of the prior art in extracting the pixel having the maximum value and forming the pattern contour.

Finally, both outputted logical signals from comparators 7x and 7y are inputted to a logical sum circuit 8 (OR circuit), where two components of the pattern contour (an, X-axis group, having angle Gp of gray level gradient vector in the ranges of ±45° and 180°±45° with reference to the X-axis and a Y-axis group, in the ranges of 90°±45° and 270°±45°) are combined, forming a completed pattern contour. The pattern contour data are stored in pattern contour memory 9.

Basic units such as, differential and vector component calculator 2, threshold processors 51x and 51y, and maximum value filters 6x and 6y in the above explanation of FIG. 8 are further explained in more details.

Figure 9:
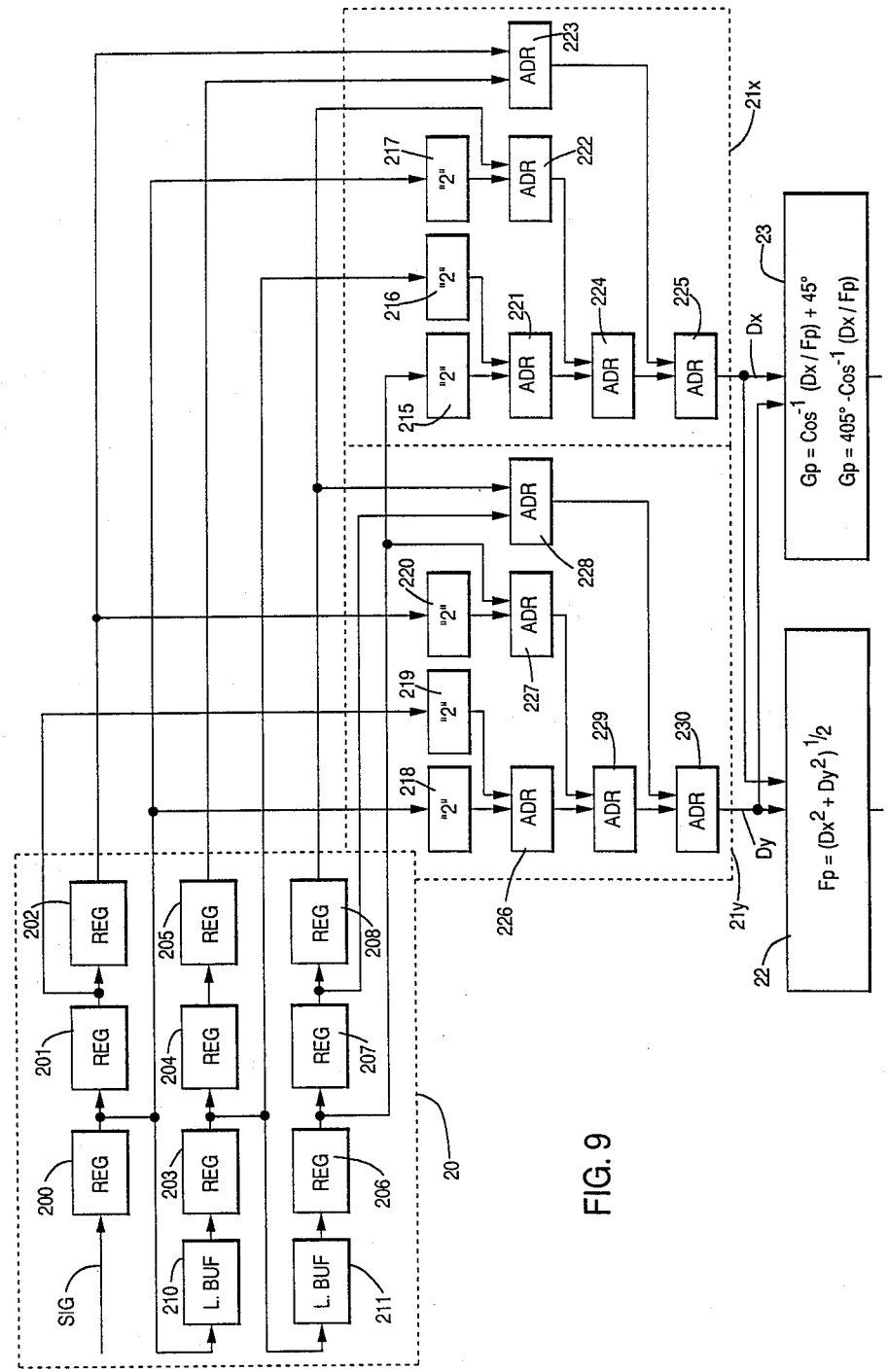
FIG. 9 shows a detailed block diagram of differential and vector component calculator 2 in FIG. 8, FIGS. 10(a) and 10(b) show a filter matrix for calculation of X-differential Dx and Y-differential Dy respectively.

FIG. 9 shows a more detailed block diagram of differential and vector component calculator 2 in FIG. 8. Image pattern data, outputted from memory unit 13 in FIG. 8, are inputted to differential and vector component calculator 2. Memory unit 13 has an address size, for example, of 512×512 pixels, each address having a memory capacity of 8 bits, and an image information signal Sig of eight bits corresponding to the gray level of each pixel. The image information signal Sig is inputted sequentially to register 200 in a window buffer circuit 20, which consists of registers 200, 201, ---208, and line buffers 210, and 211 in FIG. 9. The registers 200-208 are arranged to form a 3×3 matrix. Each register has a bit length of eight bits, corresponding to the data length of each pixel. When data signal Sig is inputted to register 200, previously stored data is shifted to register 201, and so on.

Line buffers 210 and 211 facilitate the data stored in the 3×3 register matrix 200-208 in forming a window (a specific portion) of the pattern image. Therefore, in this case, each line buffer has a capacity of storing N-1 pixel data in a row. The data, whose differential is to be calculated, is stored in the center register 204 of the matrix. The data of other neighboring pixels for calculation of differentials thereof are stored in registers 200, 201, 202, 203, 205, 206, 207, and 208.

In the above explanation, nine registers are used. Depending on the calculation method of differentials, the number of registers and line buffers can be changed, sometimes, a 4×4 or 5×5 pixels matrix is used for calculation.

Outputs from window buffer circuit 20 are connected to X-direction differential calculator 21x and Y-direction differential calculator 21y. Each differential calculator consists of three complement operators and five adders. Each of complement operators 215 to 217, or 218 to 220 has a function of outputting a complement of two, in other words, outputting reversed sign of the inputted data. With regard to X-direction differential calculator 21x, three pixel data in column direction on the right side of register matrix are added up and further the reversed data of three pixel data on the left side are added up thereto (this means subtraction) one by one. These are performed by five adders 221 to 225. X-direction differential calculator 21x has the same function of filtering the matrix image data with a filter such as shown in FIG. 10(a), resulting in calculation Dx. In a similar way, Y-direction differential calculator 21y has the similar function of calculating Dy and filtering with a filter shown in FIG. 10(b).

Both Dx and Dy data are then inputted to gradient magnitude calculator 22 and gradient direction calculator 23. In gradient magnitude calculator 22, absolute magnitude data Fp is calculated by the following equation, $$Fp=(Dx^2+Dy^2)^{\frac{1}{2}}.$$

In gradient direction calculator 23, the Gp data are calculated by the following equations, $$Gp=\cos^{-1}(Dx/Fp)+45°$$

where $Dy \geq 0$, $$Gp=405°-\cos^{-1}(Dx/Fp)$$

where $Dy < 0$.

If both Dx and Dy data are less than the specified value in the above process, the data are abandoned for extracting the pattern contour and, in this case, the special data such as 999 is outputted.

The above equations express the similar meanings as those explained in the prior art except that the Gp value is increased by 45° because of the easiness of judgment in the subsequent threshold processors. In order to distinguish gray level gradient vectors having the direction angle in the ranges of ±45° and 180°±45° (X-axis group) in the original coordinates, the above equations transform the angle ranges to 0°-90°, and 180°-270°. As a result, the discrimination in threshold processors becomes easy.

Figure 11A:
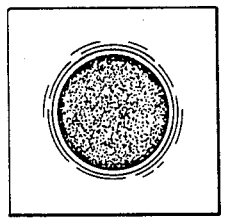
Figure 11B:
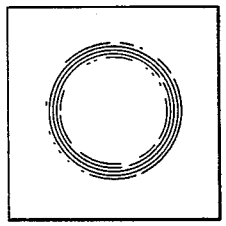
Figure 11C:
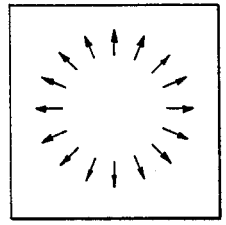

When the pattern to extract contour lines is assumed such as shown in FIG. 11(a), the outputs of Fp and Gp from gradient magnitude calculator 22 and gradient direction calculator 23 are shown in FIGS. 11(b) and 11(c) respectively. The figures are schematic because of difficulty in illustrating the magnitude and direction in two dimensional representation. Especially in FIG. 11(b), the magnitude Fp is shown by a density of the painted regions between concentric circles, but it is not clear. In an actual case, the center portion of concentric circles should exhibit the darkest region which means the magnitude thereof is maximum and it changes gradually.

Figure 12A:
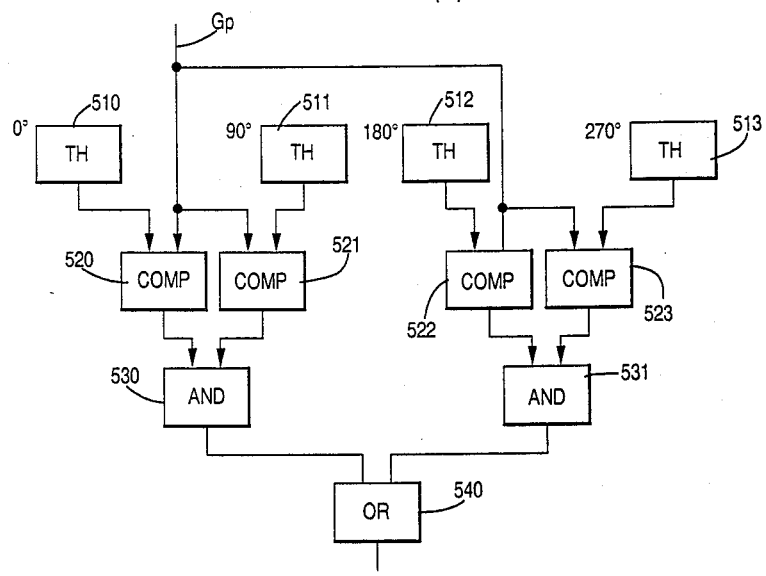
FIGS. 12(a) and 12(b) show detailed circuits of threshold processors 51x and 51y in FIG. 8, FIGS. 13(a) and 13(b) show detailed circuit of maximum value filters 6x and 6y in FIG. 8.
Figure 12B:
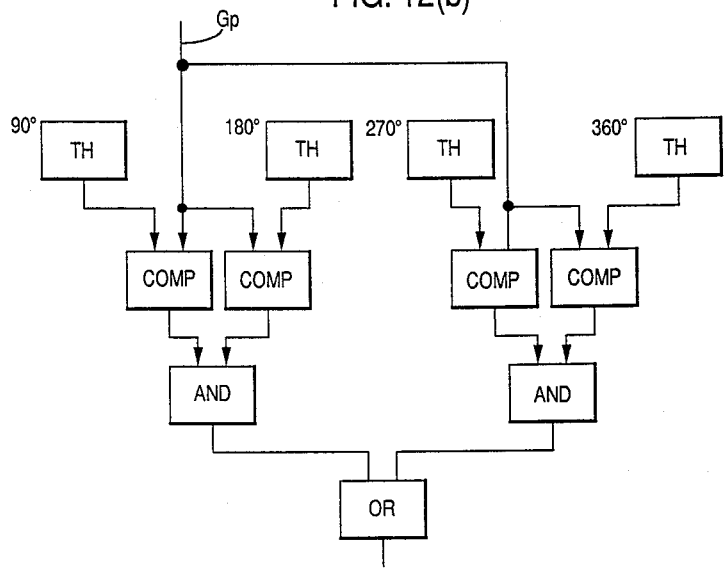

Gp data are then inputted to threshold processors 51x and 51y of FIG. 8, each processor being shown in FIG. 12(a) and FIG. 12(b) respectively. In threshold processor 51x, the angle data Gp is compared in comparators 520 and 521 with threshold values 0° and 90°, the threshold data being given by threshold registers 510 and 511. When Gp is found to be between 0° and 90°, AND circuit 530 outputs, for example, logical "1". AND circuit 531 outputs logical "1" when Gp is found to be between 180° and 270°. Both outputs are inputted to OR circuit 540, therefore, OR circuit 540 outputs logical "1" when Gp is comprised in ranges of 0° to 90° and 180° to 270°. This means that Gp is in the ranges of ±45° and 180°±45° in the original coordinates.

Figure 11D:
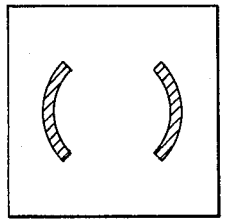
Figure 11E:
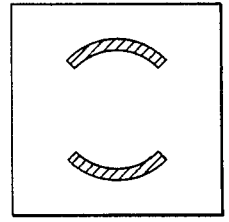

In the same way, threshold processor 51y shown in FIG. 12(b) has a function of outputting, for example, logical "1", when Gp comprised is comprised in the ranges of 90°±45° and 270°±45° in the original coordinates. Image patterns of two outputs from threshold processors 51x and 51y are schematically shown in FIGS. 11(d) and 11(e) respectively. In the hatched regions, data of logical "1" are outputted.

Figure 11F:
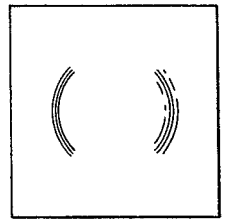
Figure 11G:
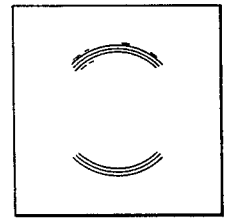

These logical data are multiplied in product circuits 55x and 55y of FIG. 8, resulting in outputting Fp data in the selected two regions corresponding to the above logical "1" regions of FIGS. 11(d) and 11(e). The results are shown schematically in FIGS. 11(f) and 11(g).

The output from product circuits 55x and 55y is processed in a maximum value filter. Maximum value filter 6x for the X-component is shown in FIG. 13(a), and maximum value filter 6y for the Y-component is shown in FIG. 13(b).

Figure 13A:
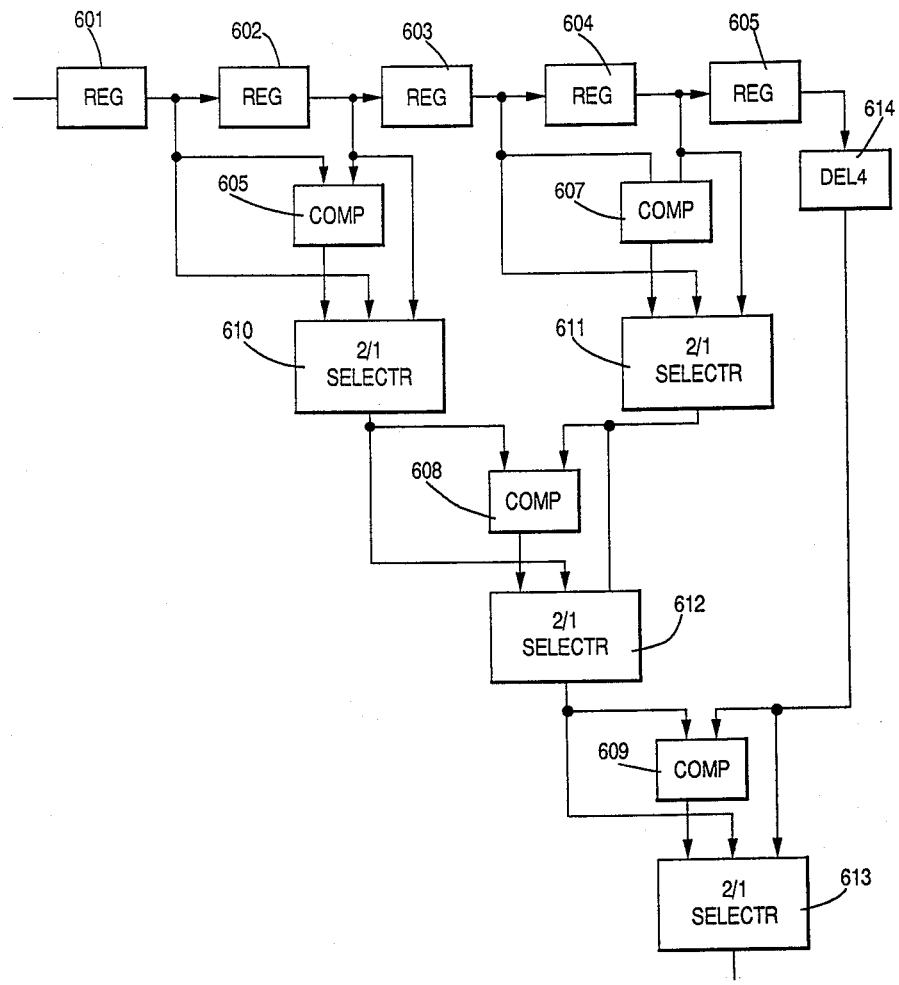

When Fp data for an X-axis group are inputted to registers 601, 602, 603, 604, and 605 sequentially in FIG. 13(a), comparator 606 and selector 610 have a function of outputting the larger Fp value between two neighboring pixel data stored in registers 601 and 602. In the same way, the larger Fp value of two Fp data stored in registers 603 and 604 is outputted from selector 611. Fp outputs from selectors 610 and 611 are then compared in comparator 608, and the larger value of outputs from selectors 610, 611 and comparator 608 is is selected and outputted from selector 612. Finally, this output is further compared with Fp data stored in register 605 and outputted through delay circuit 614 together with an output from comparator 609, and the largest Fp value among five Fp values is obtained from selector 613.

Figure 14:
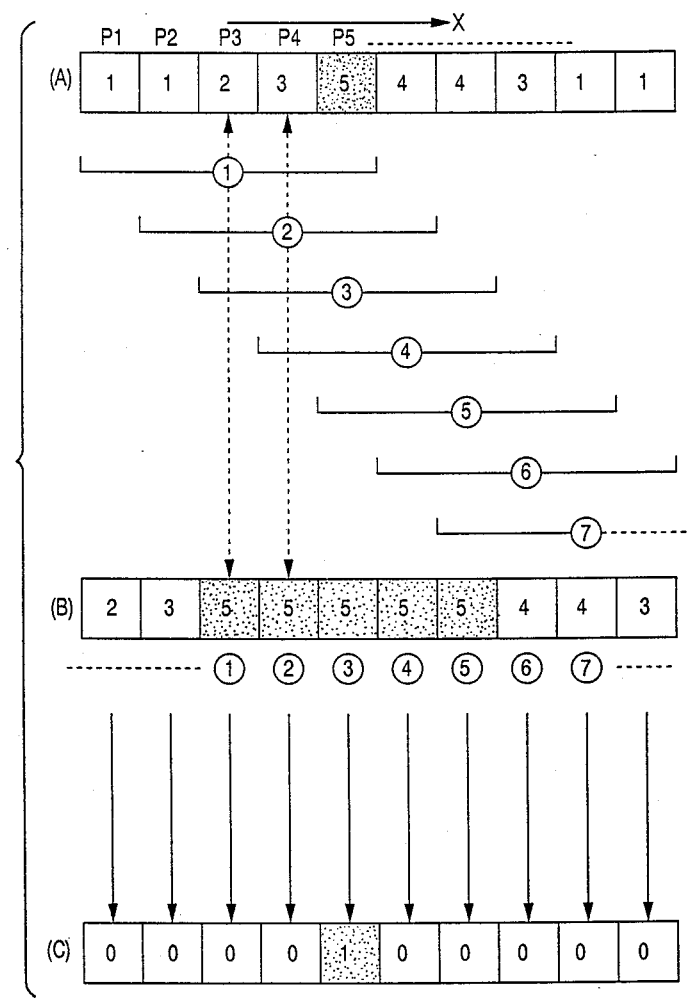
FIG. 14 illustrates schematically the function of maximum value filter 6x and comparator 7x in FIG. 8.

Each Fp data before filtering process is assumed to be numerical data as shown in the upper row (A) in FIG. 14. Pixel P3 having Fp data "2" is compared with data of pixels P1, P2, P4, and P5, these pixels being located on both left and right sides of pixel P3. Then Fp value of P3 is converted to the maximum value, in this case, "5". After every pixel is processed in this way, a series of Fp values shown in the upper row (A) is converted to a series of numerals in the middle row (B). Outputted data shown in row (B) is further compared with the original data shown in row (A), and logical "1" is given when the pixel has the same magnitude, otherwise logical "0" is given as provided by comparator 7x of FIG. 8. The result is shown in the lower row (C).

Figure 13B:
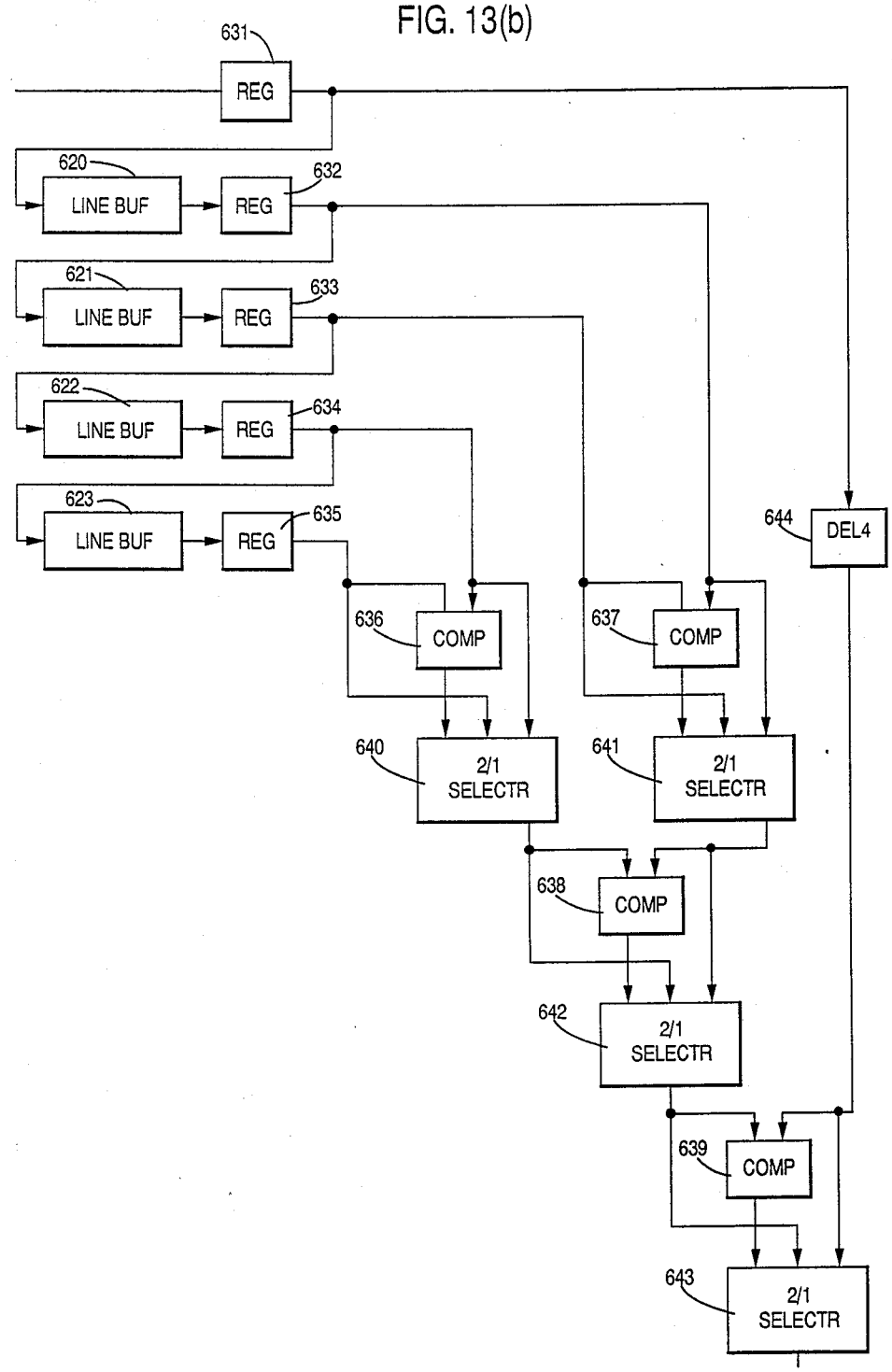

Maximum value filter 6y has the similar function except that it deals with Y-direction components, which necessitates four line buffers 620 to 623 shown in FIG. 13(b). Other components such as registers 631 to 635, comparators 636 to 639, selectors 640 to 643, and delay circut 644 have the same functions as those explained in FIG. 13(a).

Outputted image patterns from maximum value filters 6x and 6y are schematically shown in FIGS. 11(h) and 11(i). And further, outputted image patterns from comparators 7x and 7y are also schematically shown in FIGS. 11(j) and 11(k) respectively. FIG. 11(j) shows pattern contours in the ranges of ±45° and 180°±45° with regard the X-axis, and FIG. 11(k), in the ranges of 90°±45° and 270°±45°.

Two image patterns are combined in OR circuit 8 in FIG. 8, resulting in outputting the contour patterns shown in FIG. 11(l), and stored in pattern contour memory 9.

2. Second embodiment

Figure 15:
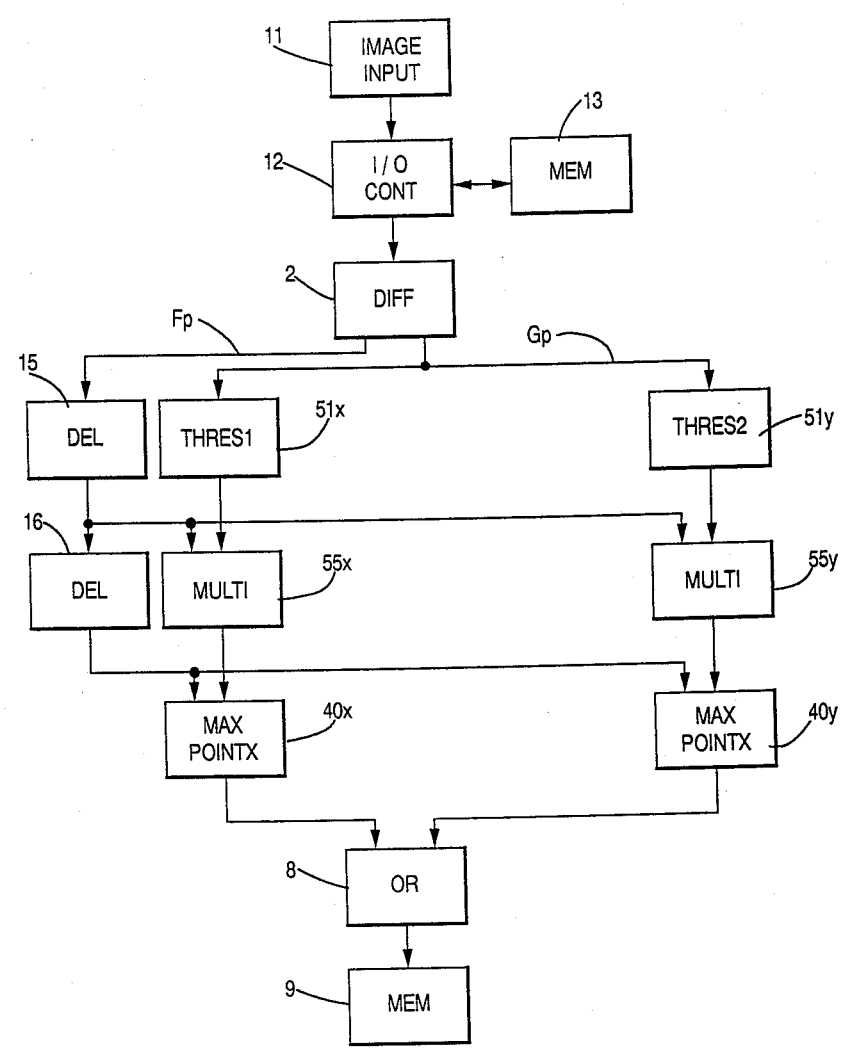
FIG. 15 shows a block diagram of the second embodiment of the present invention.

A block diagram of the second embodiment of the present invention is shown in FIG. 15. The same reference numerals as those used in FIG. 8 designate and identify the same units having the same function. The only difference is related to the units for discriminating the pixel having the maximum magnitude among neighboring pixels.

In the second embodiment, the outputs of product circuits 55x and 55y and the magnitude data Fp of the gray level gradient vector are inputted to maximum point detection circuits 40x and 40y respectively. Maximum point detection circuit 40x for the X-axis group is shown in FIG. 16(a), and maximum point detection circuit 40y for the Y-axis group is shown in FIG. 16(b).

Figure 16A:
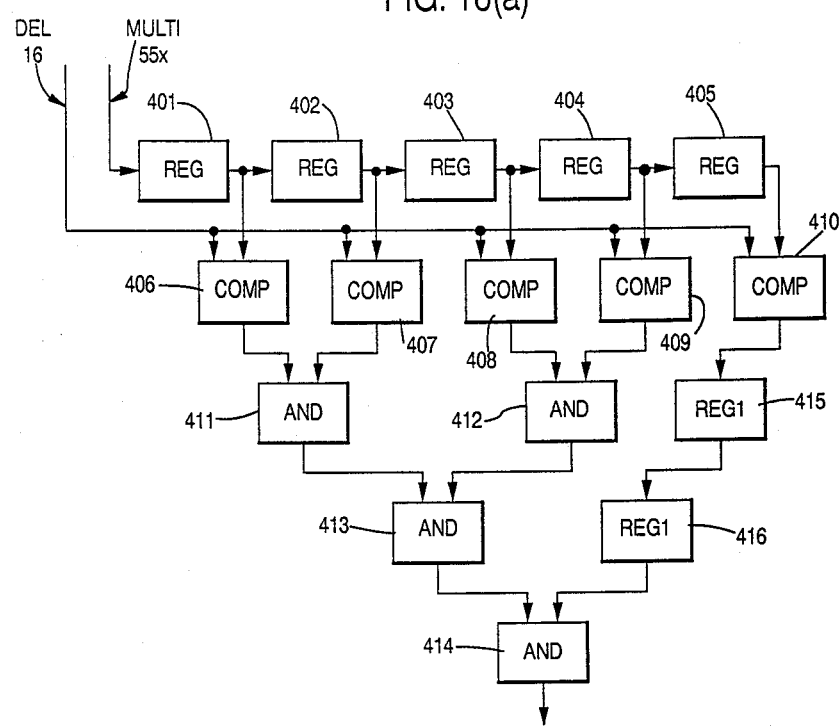
FIGS. 16(a) and 16(b) show detailed circuit of maximum point detection circuits 40x and 40y in FIG. 15.

In FIG. 16(a), the output from product circuit 55x is sequentially inputted to registers 401 to 405. Fp data of the center pixel subjected to discrimination, inputted from delay circuit 16, is compared in comparators 406 to 410 with data from 5 pixels as provided by registers 40-405. Each comparator has a function of outputting logical "1" when the leftside input signal is equal to or larger than the rightside signal in FIG. 16(a). Five outputs from comparators 406 to 410 are processed through AND circuits 411 to 414 and delay circuits 415, 416. Finally AND circuit 414 outputs logical "1" when Fp data of the center pixel is equal to or larger than the maximum value of five pixels arranged in the X-direction.

Figure 16B:
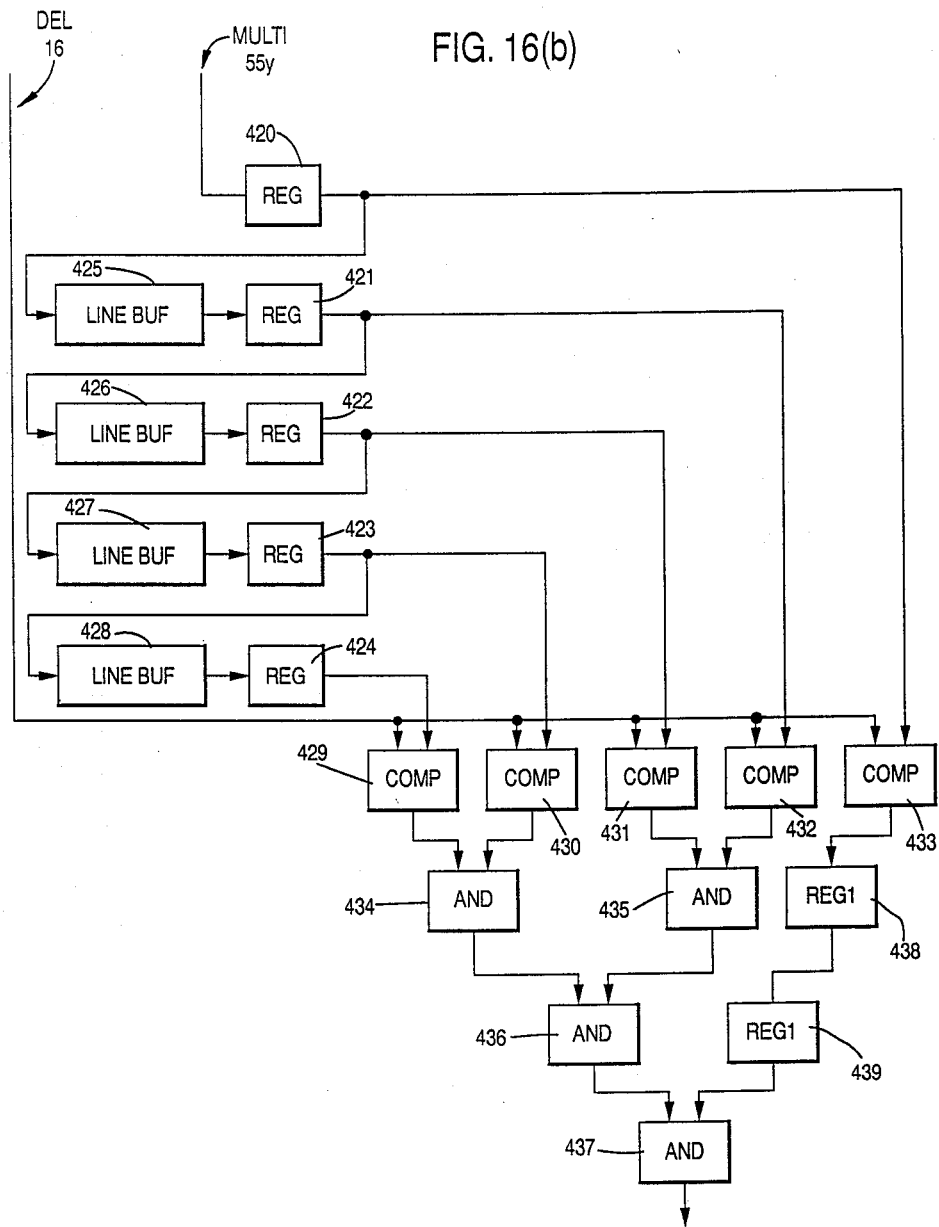

Maximum point detection circuit 40y shown in FIG. 16(b) has also the similar function as explained above except that the comparisons and detection are performed in the Y-direction. The output data from product circuit 55y is first arranged in the Y-direction using registers 420 to 424 and line buffers 425 to 428, then subsequently comparisons and detections are performed in comparatores 429 to 433, AND circuits 434 to 437, and delay circuits 438 and 439. Finally AND circuit 437 oututs logical "1" when Fp data of the center pixel is equal to or larger than the maximum value of five pixels arranged in Y-direction.

Outputs of maximum point detection circuits 40x and 40y for the X-direction and Y-direction respectively are combined in OR circuit 8 of FIG. 15, resulting in outputting the completed pattern contours.

3. Third embodiment

In the first and second embodiments, extraction of pattern contours becomes inaccurate when a plurality of pixels having the same magnitude of gray level gradient are continuously arranged in the direction of the discriminating process.

For example, a series of magnitude data for the gray level gradient of 15 pixels arranged in the X-direction is assumed such as shown in FIG. 17. Pixels P9, P10, and P11 have the same magnitude data of "3". When pixels P6 and P11 are subjected to the comparison and discrimination processes among neighboring 5×1 pixels as explained in the previous embodiments, both pixels P6 and P11, each having a magnitude of "5" and "3" respectively, are selected as pixels forming pattern contour. Pixel P6 has the magnitude of "5", and it is the maximum magnitude and larger than any other of pixels P4 to P8. Therefore, P6 is suitable for pattern contours. However, P11 is arranged with two neighboring pixels P9 and P10 having the same magnitude "3", therefore, P11 is unsuitable for forming pattern contours, because P11 is not the only one pixel having a maximum magnitude.

To solve the above problem, it is better to add the following conditions for extracting pattern contour. Namely, in addition to the previous requirement that the center pixel subjected to discrimination has the maximum magnitude of gray level gradient among the neighboring pixels of the specified number, it is required that there exists a pixel, the magnitude thereof being less than that of the center pixel, located on each side of the center pixel. With regard to FIG. 17, pixel P6 has neighboring pixels, the magnitude thereof being less than "5" on both left and right sides. However, pixel P11 has no neighboring pixel on the left side, of which the magnitude is less than "3". Therefore, P11 is not eligible for forming the pattern contour according to the above noted requirement.

A block diagram of the third embodiment of the present invention is shown in FIG. 18. The same reference numerals as those used in FIGS. 8 and 15 designate and identify the same units having the same function. The difference exists in maximum and minimum discriminator circuits 70 to 77 and two five-input comparators 79x and 79y.

Figure 19:
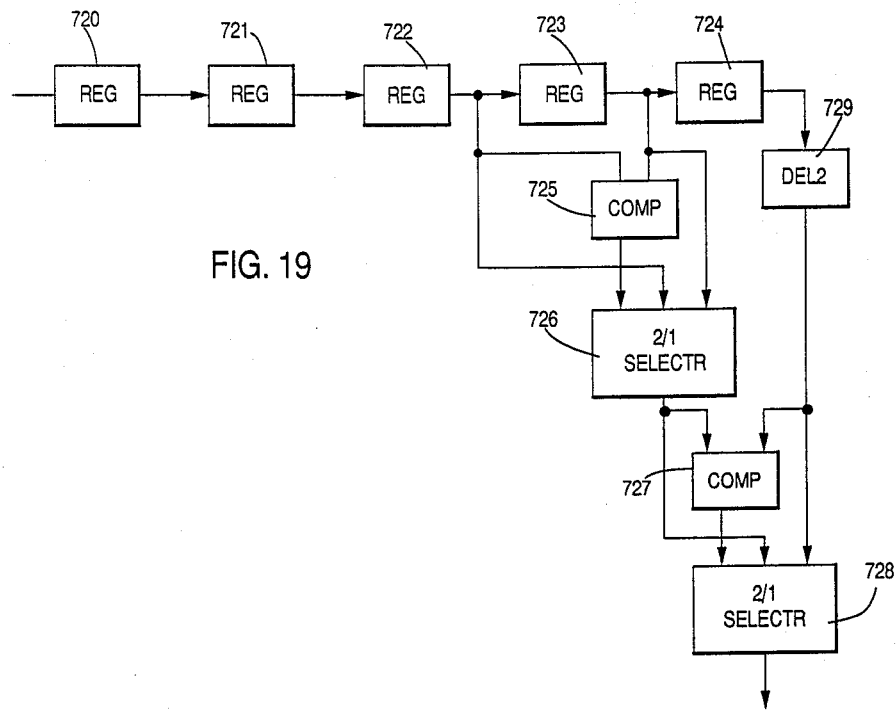

The details of right maximum discriminator circuit 72 is shown in FIG. 19. The gray level gradient signal is sequentially inputted to registers 720 to 724, thereby the signal levels from register 722 and register 723 are compared in comparator 725. Comparator 725 and selector 726 have the same functions as explained previously. Namely, when the signal level from register 722 is greater than or equal to the signal level from register 723, then comparator 725 outputs logical "1". In this case, selector 726 outputs a signal, which has the same level as outputted from register 722. Comparator 727 and selector 728 have the similar functions, and finally, selector 728 outputs the maximum level of gray level gradient among three pixels consisting of the center pixel and two rightside neighboring pixels.

Figure 20:
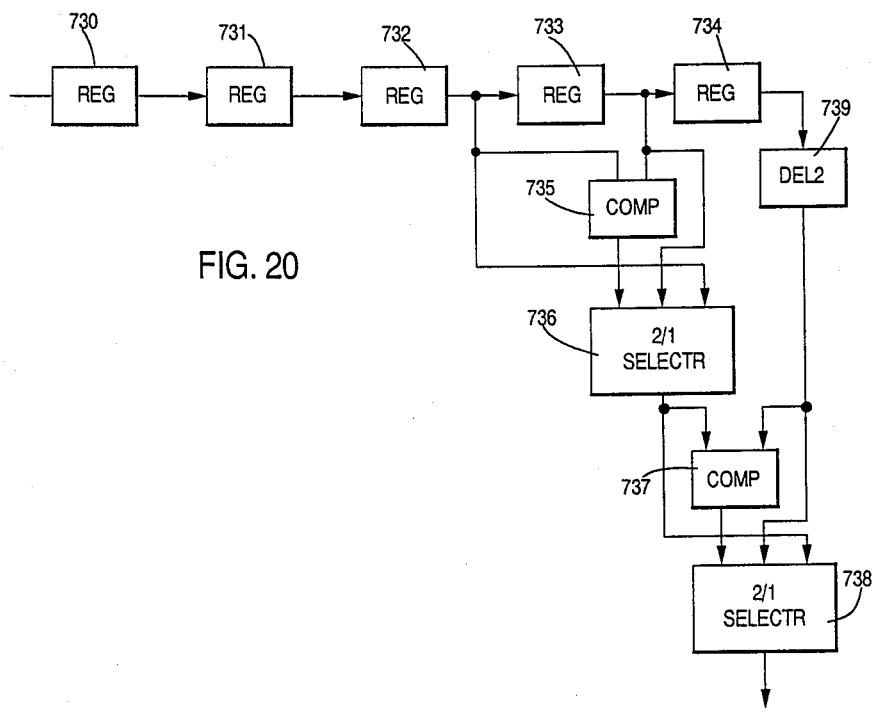

Right minimum discriminator circuit 73 is shown in FIG. 20. Registers 730 to 734, comparators 735 and 737, and selectors 736 and 738 have the similar functions as those explained on FIG. 19 except that terminal positions of inputted signals to selectors are reversed. Therefore, right minimum discriminator circuit 73 outputs the minimum level of gray level gradient for the three pixels consisting of the center pixel and two rightside neighboring pixels.

Figure 21:
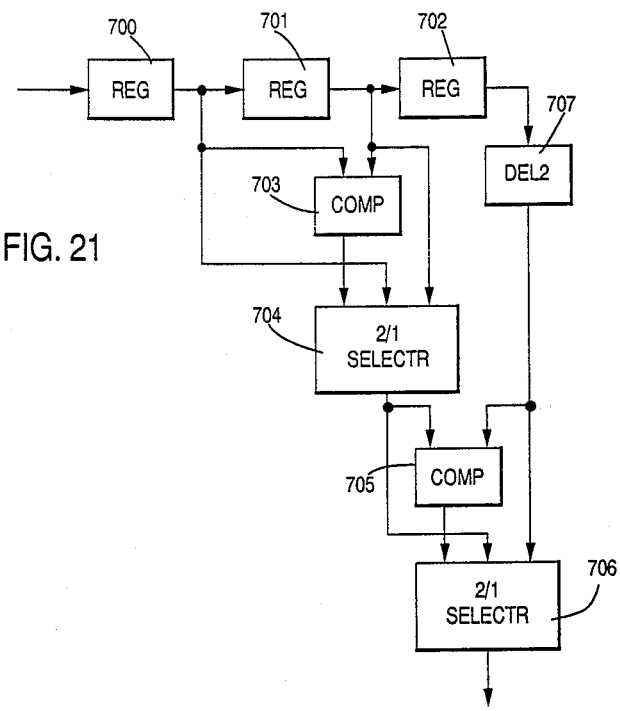
Figure 22:
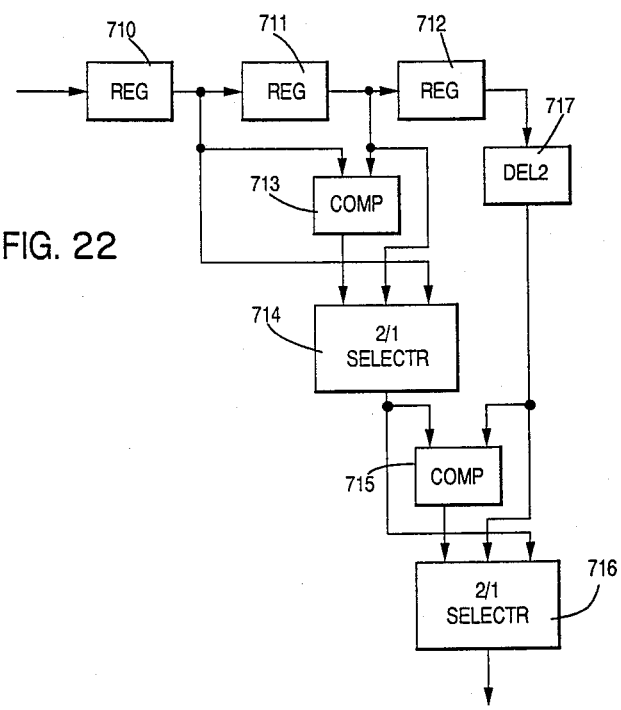

FIGS. 21 and 22 show left maximum discriminator circuit 70 and left minimum discriminator circuit 71 respectively. Left maximum discriminator circuit 70 is consisted of three registers 700 to 702, two comparators 703 and 705, two selectors 704 and 706 and delay circuit 707. The reason that three registers are used, as opposed to five registers in FIGS. 19 and 20, is that the discrimination procedures with regard to the center pixel is required to be synchronous on both sides thereof. The discriminator circuit 70 has a function of outputting the maximum gray level gradient among the center pixel and two leftside neighboring pixels. Similarly, left minimum discriminator circuit 71 of FIG. 22 is consisted of three registers 710 to 712, two comparators 713 and 715, two selectors 714 and 716 and delay circuit 717 and has a function of outputting the minimum gray level gradient among the center pixel and two leftside neighboring pixels.

In FIG. 8, up maximum discriminator circuit 74, up minimum discriminator circuit 75, down maximum discriminator circuit 76, and down minimum discriminator circuit 77 have the similar functions as those explained for FIGS. 19 to 22 except that these circuits deal with processes in the Y-axis direction. Therefore, details are shown representatively only for up maximum discriminator circuit 74 and down maximum discriminator 76.

Figure 23:
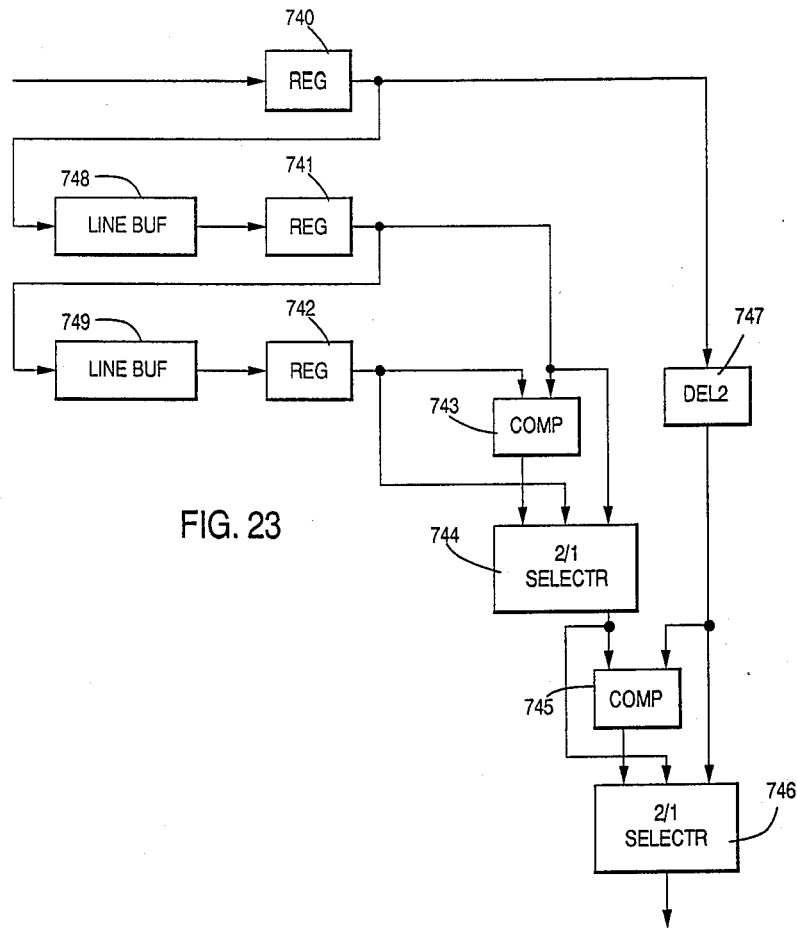

FIG. 23 shows a block diagram of up maximum discriminator circuit 74, wherein three registers 740 to 742, two comparators 743 and 745, two selectors 744 and 746, delay circuit 747, and two line buffers 748 and 749 are provided. There are differences from FIGS. 19 and 21 in that the input signal of the gray level gradient is processed through resisters and line buffers due to the necessity of arranging the data in the Y-axis direction.

Figure 24:
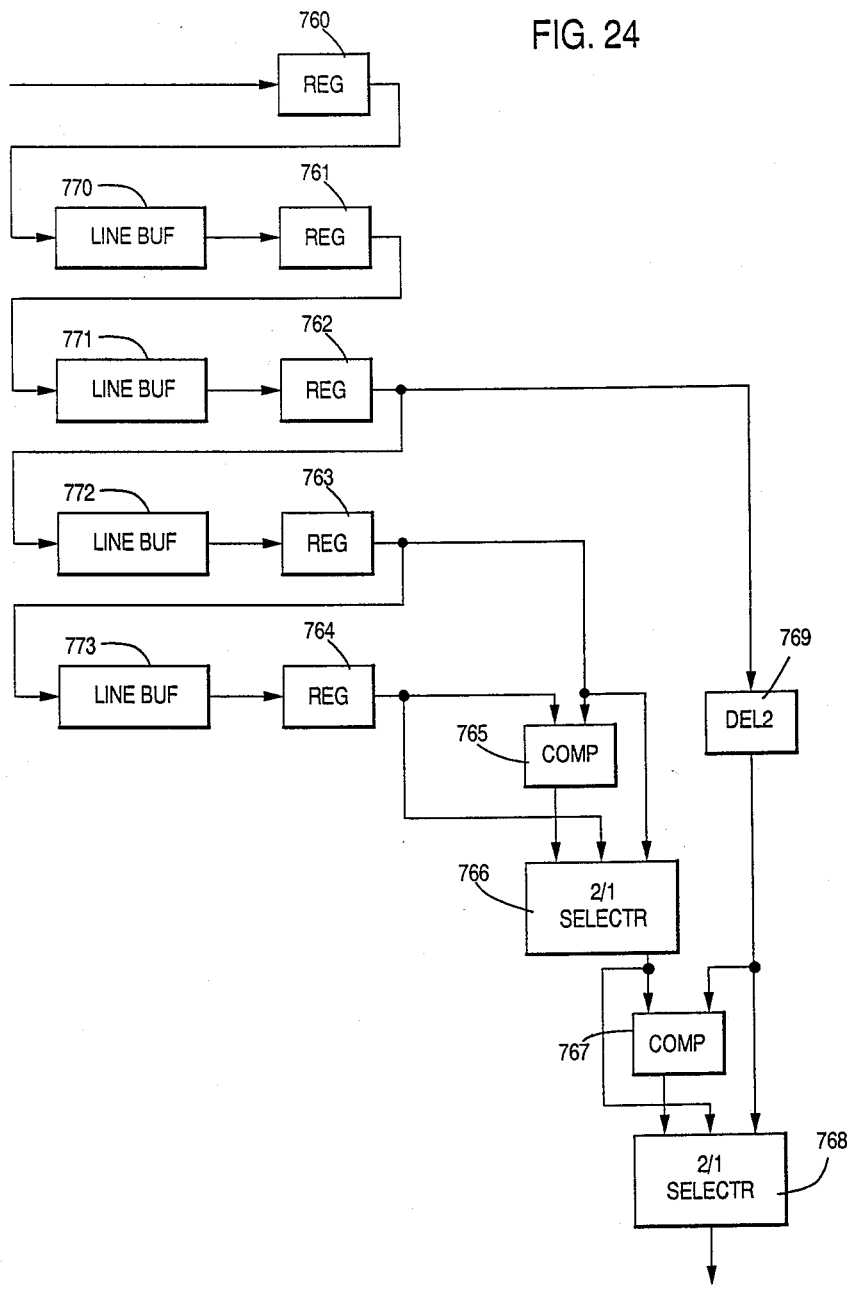

FIG. 24 shows a block diagram of down maximum discriminator circuit 76, wherein five registers 760 to 764, two comparators 765 and 767, two selectors 766 and 768, delay circuit 769, and four line buffers 770 to 773 are provided. The only difference between FIGS. 23 and 24 exists in the number of registers and line buffers, because discrimination process should be performed synchronous with regard to the data arranged in upside and downside directions.

Up minimum discriminator circuit 75 and down minimum discriminator circuit 77 of FIG. 8 are almost the same as up maximum discriminator 74 and down maximum discriminator 76 shown in FIGS. 23 and 24 respectively except that terminal positions of inputted signals to selectors are reversed in order to calculate the minimum values, therefore, detailed block diagrams are omitted.

Output signals from discriminator circuits 70 to 73 and 74 to 77 are inputted to five-input comparators 79x and 79y respectively. Therein the gray level gradient of the center pixel is compared in such a way as to determine whether the center pixel has the maximum magnitude of gray level gradient among the neighboring pixels arranged on both sides of the center pixel, and as to determine whether the gray level gradient of the center pixel is greater than the minimum magnitude of neighboring pixels arranged on each side of the center pixel. In other words, comparators 79x and 79y facilitate determination that there is a pixel, the magnitude thereof being less than that of the center pixel located on each side of the center pixel. When these conditions are satisfied, the center pixel is judged to be the pixel forming the pattern contours.

Figure 25:
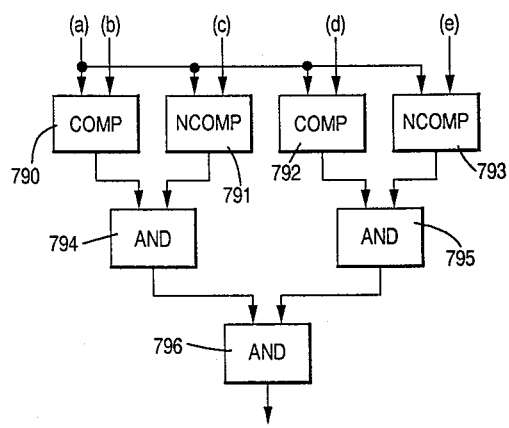

Five-input comparator 79x of FIG. 18 is representatively shown in FIG. 25, where four comparators and three AND circuits are used. In FIG. 25, two comparators 790 and 792 have the same function as explained previously, i.e. of outputting logical "1" when the leftside signal is greater than or equal to the rightside signal. However, two comparators 791 and 793 have a function of outputting logical "1" only when the leftside input signal is greater than the rightside signal.

In a case of five-input comparator 79x of FIG. 25, terminal (a) is connected to delay circuit 16 of FIG. 18; terminal (b), to left maximum discriminator circuit 70; terminal (c), to left minimum discriminator circuit 71; terminal (d), to right maximum discriminator circuit 72; and terminal (e), to right minimum discriminator circuit 73.

When the gray level gradient signal of the center pixel is equal to or greater than the output of left maximum discriminator circuit 70 and is also greater than the output of left minimum discriminator circuit 71, both comparators 790 and 791 output logical "1", and AND circuit 794 outputs logical "1". And further, when the gray level gradient signal of the center pixel is equal to or greater than the output of right maximum discriminator circuit 72 and is also greater than the output of right minimum discriminator circuit 73, both comparators 792 and 793 output logical "1", and AND circuit 795 outputs logical "1". Finally AND circuit 796 outputs logical "1". The above conditions show that the center pixel satisfies the conditions of forming the contour line. Five-input comparator 79y has the same function as 79x except that the direction is related to the Y-axis.

Outputs from two five-input comparators 79x and 79y are combined in OR circuit 8 in FIG. 18 forming the completed pattern contour, and are stored in memory unit 9.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are therefore, to be embraced therein.

We claim:

1. A method of extracting pattern contours from an image formed by a plurality of pixels arranged in x and y coordinates, each pixel having a gray level graident, said method comprising the steps of:
   (a) calculating and outputting a magnitude and direction of the gray level gradient of each pixel among the plurality of pixels;
   (b) discriminating the direction of the gray level gradient from within predetermined ranges, and outputting the magnitude of the discriminated gray level gradient for a first group among the plurality of pixels, the discriminated direction of the gray level gradient being within a specified angle range relative to the X-axis and outputting a null signal for pixels not within the specified angle range;
   (c) discriminating the direction of the gray level gradient from within predetermined ranges, and outputting the magnitude of the discriminated gray level gradient for a second group among the plurality of pixels, the discriminated direction being within a specified angle range relative to the Y-axis and outputting a null signal for pixels not within the specified angle range;
   (d) discriminating each pixel from among the first group, a pixel being discriminated when having a magnitude of gray level gradient greater than or equal to the magnitude of gray level gradient of a specified number of adjacent pixels located on both sides of the pixel in the X-direction, outputting a first level logic signal for said discriminated pixel, and outputting a second level logic signal when the pixel is not discriminated;
   (e) discriminating each pixel from among the second group, a pixel being discriminated when having a magnitude of gray level gradient greater than or equal to the magnitude of gray level gradient of a specified number of adjacent pixels located on both sides of the pixel in the Y-direction, outputting a first level logic signal for said discriminated pixel, and outputting a second level logic signal when the pixel is not discriminated; and (f) forming the pattern contours by providing a logical sum of the outputted logic signals from said steps (d) and (e).

2. A method of extracting pattern contours according to claim 1, said discriminating step (d) further comprising the sub-steps of:

replacing the magnitude of gray level gradient of each pixel of the first group with a maximum magnitude of gray level gradient among the pixel and specified number of adjacent pixels located on both sides of the pixel in the X-direction, comparing the magnitude of the pixel with the replaced maximum magnitude, outputting a first level logic signal for said discriminated pixel when the magnitude of gray level gradient of the pixel is the same as the replaced maximum magnitude, and outputting a second level logic signal when the magnitude of gray level gradient of the pixel is less than the replaced maximum magnitude; and said discriminating step (e) further comprising the sub-steps of:

replacing the magnitude of gray level gradient of each pixel of the second group with a maximum magnitude of gray level gradient among the pixel and the specified number of adjacent pixels located on both sides of the pixel in the Y-direction, comparing the magnitude of the pixel with the replaced maximum magnitude, outputting a first level logic signal for said discriminated pixel when the magnitude of gray level gradient of the pixel is the same as the replaced maximum magnitude, and outputting a second level logic signal when the magnitude of gray level gradient of the pixel is less than the replaced maximum magnitude.

3. A method of extracting pattern contours according to claim 1, wherein said discriminating step (d) further includes outputting the first level logic signal when the magnitude of gray level gradient of the pixel of the first group is greater than a minimum magnitude of the specified number of adjacent pixels located on each side of the pixel in the X-direction and wherein said discriminating step (e) further includes outputting the first level logic signal when the magnitude of gray level gradient of the pixel of the second group is greater than a minimum magnitude of the specified number of adjacent pixels located on each side of the pixel in the Y-direction.

4. A method of extracting pattern contours according to claim 1, wherein said step (a) further comprises the step of outputting a special code for one of the pixels, when the magnitude of gray level gradient of the pixel is less than a specified value.

5. A method of extracting pattern contours according to claim 1, wherein said specified angle range in said steps (b) and (c) comprises ±45° and 180°±45° for the first group and 90°±45° and 270°±45° for the second group.

6. An apparatus for extracting pattern contours from an image formed by a plurality of pixels arranged in X and Y coordinates, each pixel having a gray level gradient with a magnitude and direction, said apparatus comprising:

first means for calculating the magnitude and direction of gray level gradient for a pixel;

second means for discriminating the direction of the gray level gradient from among a specified angle range with respect to the X-axis, and outputting said discriminated magnitude of the gray level gradient for a first group of pixels, said second means outputting a null signal for other pixels not discriminated from within the specified angle range with respect to the X-axis;

third means for discriminating the direction of the gray level gradient from among a specified angle range with respect to the Y-axis, and outputting said discriminated magnitude of the gray level gradient for a second group of pixels, said third means outputting a null signal for other pixels not discriminated from within the specified angle range with respect to the Y-axis;

fourth means for discriminating each pixel from within the first group, a pixel being discriminated when having the magnitude of gray level gradient greater than or equal to a maximum magnitude of adjacent pixels of a specified number located on both sides of the pixel in the X-direction, said fourth means outputting a first level logic signal for said discriminated pixel, and outputting a second level logic signal when the pixel is not discriminated;

fifth means for discriminating each pixel from within the second group, a pixel being discriminated when having the magnitude of gray level gradient greater than or equal to the magnitude of adjacent pixels of the specified number located on both sides of the pixel in the Y-direction, said fifth means outputting a first level logic signal for said discriminated pixel, and outputting a second level logic signal when the pixel is not discriminated; and a logic sum circuit for summing the outputted logic signals from said fourth and fifth means.

7. An apparatus for extracting pattern contours according to claim 6, said fourth means comprising:

means for replacing the magnitude of gray level gradient of each pixel of the first group with a maximum magnitude of gray level gradient among the pixel and adjacent pixels of the specified number located on both sides of the pixel in the X-direction, comparing the magnitude of the pixel with said replaced maximum magnitude, outputting a first level logic signal corresponding to said discriminated pixel when the magnitude of gray level gradient of the pixel is the same as said replaced maximum magnitude, and outputting a second level logic signal when the pixel is not discriminated; and said fifth means comprising:

means for replacing the magnitude of gray level gradient of each pixel of the second group with a maximum magnitude of gray level gradient among the pixel and adjacent pixels of the specified number located on both sides of the pixel in the Y-direction, comprising the magnitude of the pixel with said replaced maximum magnitude, outputting a first level logic signal corresponding to said discriminated pixel when the magnitude of gray level gradient of the pixel is the same as said replaced maximum magnitude, and outputting a second level logic signal when the pixel is not discriminated.

8. An apparatus of extracting pattern contours according to claim 6, said fourth means comprising:

means for discriminating each pixel from among the first group by comparing the magnitude of gray level gradient of the pixel with a minimum magnitude of the adjacent pixels located on each side of the pixel in the X-direction; and said fifth means comprising:

means for discriminating each pixel from among the second group by comparing the magnitude of gray level gradient of the pixel with a minimum magnitude of the adjacent pixels located on each side of the pixel in the Y-direction.

* * * * *

UNITED STATES PATENT AND TRADEMARK OFFICE
CERTIFICATE OF CORRECTION

PATENT NO. : 4,908,872

DATED : March 13, 1990

INVENTOR(S) : Takashi Toriu et al.

It is certified that error appears in the above-identified patent and that said Letters Patent is hereby corrected as shown below:

FRONT PAGE [57] ABSTRACT, line 6, "a" should be --the--; and
line 6, "the" should be --a--;
line 9, "within groups" should be --within two groups--; and
line 9, "pixel," should be --pixels,--;
line 12, "Y-axis." should be --Y axis group.--.

Col. 1, line 18, "character contour" should be --character. Contour--.

Col. 3, line 18, "numeals" should be --numerals--;
line 30, "in to" should be --into--;
line 33, "banded" should be --bounded--.

Col. 4, line 11, "in process" should be deleted;
line 32, "is" should be deleted.

Col. 5, line 48, "substituted" should be --substitution--.

Col. 6, line 5, "as determined" should be deleted;
line 6, "group by" should be --group as determined by--;
line 40, "painted" should be deleted;
line 63, "circuit" should be --circuits--.

UNITED STATES PATENT AND TRADEMARK OFFICE
CERTIFICATE OF CORRECTION

PATENT NO. : 4,908,872

DATED : March 13, 1990

INVENTOR(S) : Takashi Toriu et al.

It is certified that error appears in the above-identified patent and that said Letters Patent is hereby corrected as shown below:

Col. 7, line 1, "circuit" should be --circuits--;
line 54, "55yare" should be --55y are--;
line 60, "replaced" should be --replacing--;
line 61, "at the" should be --of a--; and
line 61, "of" should be --having an--.

Col. 8, line 64, "outputting reversed" should be --outputting a reversed--.

Col. 9, line 5, "calculation Dx." should be --calculation of Dx.--;
line 56, "51yof" should be --51y of--.

Col. 10, line 3, "comprised" (both occurrences) should be deleted;
line 29, "608 is is" should be --608 is--;
line 35, "process is" should be deleted;
line 39, "Then Fp" should be --Then the Fp--.

Col. 11, line 22, "40-405." should be --401-405.--.

Col. 13, line 25, "FIG. 8" should be --FIG. 18--.

Signed and Sealed this

Sixteenth Day of July, 1991

Attest:

HARRY F. MANBECK. JR.

Attesting Officer    Commissioner of Patents and Trademarks